United States Patent
Myntti

(10) Patent No.: US 12,331,265 B2
(45) Date of Patent: Jun. 17, 2025

(54) HARD SURFACE DISINFECTING COMPOSITION COMPRISING A C2-C4 ALCOHOL AND PEROXYMONOSULFATE ANION

(71) Applicant: Next Science IP Holdings Pty Ltd, Chatswood (AU)

(72) Inventor: Matthew F. Myntti, Ponte Vedra Beach, FL (US)

(73) Assignee: Next Science IP Holdings Pty Ltd, Sydney (AU)

(*) Notice: Subject to any disclaimer, the term of this patent is extended or adjusted under 35 U.S.C. 154(b) by 563 days.

(21) Appl. No.: 17/590,678

(22) Filed: Feb. 1, 2022

(65) Prior Publication Data

US 2022/0154101 A1 May 19, 2022

Related U.S. Application Data

(63) Continuation of application No. PCT/US2021/055043, filed on Oct. 14, 2021.

(60) Provisional application No. 63/091,617, filed on Oct. 14, 2020.

(51) Int. Cl.

| | | |
|---|---|---|
| C11D 1/12 | (2006.01) |
| A01N 25/30 | (2006.01) |
| A01N 33/12 | (2006.01) |
| A01P 1/00 | (2006.01) |
| C11D 1/14 | (2006.01) |
| C11D 7/26 | (2006.01) |
| C11D 17/00 | (2006.01) |

(52) U.S. Cl.
CPC .............. C11D 1/146 (2013.01); A01N 25/30 (2013.01); A01N 33/12 (2013.01); A01P 1/00 (2021.08); C11D 7/261 (2013.01); C11D 17/0008 (2013.01); C11D 2111/20 (2024.01)

(58) Field of Classification Search
CPC ........... C11D 1/12; C11D 3/042; C11D 3/046; C11D 3/201; C11D 3/39; C11D 3/48; C11D 7/5004; C11D 9/10; C11D 9/42; C11D 2111/14; C11D 2111/20
See application file for complete search history.

(56) References Cited

U.S. PATENT DOCUMENTS

| | | | |
|---|---|---|---|
| 5,238,843 A * | 8/1993 | Carpenter | A61K 8/66 435/263 |
| 7,959,943 B2 | 6/2011 | Hissong et al. | |
| 7,976,873 B2 | 7/2011 | Myntti et al. | |
| 7,993,675 B2 | 8/2011 | Oliver et al. | |
| 10,021,876 B2 | 7/2018 | Myntti | |
| 11,118,143 B2 | 9/2021 | Myntti | |
| 11,723,361 B2 | 8/2023 | Myntti | |
| 2002/0004057 A1* | 1/2002 | Tabasso | A01N 37/16 514/714 |
| 2007/0286907 A1 | 12/2007 | Siegel et al. | |
| 2011/0245757 A1 | 10/2011 | Myntti et al. | |
| 2018/0086694 A1 | 3/2018 | Howell et al. | |
| 2018/0230408 A1* | 8/2018 | Myntti | C11D 3/38636 |
| 2020/0085037 A1 | 3/2020 | Myntti | |
| 2023/0380420 A1 | 11/2023 | Myntti | |

FOREIGN PATENT DOCUMENTS

| | | |
|---|---|---|
| WO | WO-2009151912 A1 | 12/2009 |
| WO | WO-2017027418 A1 | 2/2017 |
| WO | WO-2017069820 A2 | 4/2017 |
| WO | WO-2018005702 A1 | 1/2018 |

OTHER PUBLICATIONS

International Search Report issued Mar. 2, 2022 in PCT/US21/55043, 5 pages.
Extended European Search Report issued Jan. 27, 2025 in Patent Application No. 21881112.3, 15 pages.

* cited by examiner

*Primary Examiner* — Charles I Boyer
(74) *Attorney, Agent, or Firm* — Element IP, PLC; David G. Burleson

(57) ABSTRACT

A composition, lethal to a broad spectrum of microorganisms and capable of repeated applications to hard surfaces, includes solvent and solute components. The solvent component includes water and a lesser amount of at least one organic liquid, while the solute component includes a weak acid, a conjugate base of that acid, an oxidizing electrolyte, and an ionic surfactant. The composition is acidic but has a pH of at least 2.5 and an effective solute concentration of at least 2.5 Osm/L.

20 Claims, No Drawings

HARD SURFACE DISINFECTING COMPOSITION COMPRISING A C2-C4 ALCOHOL AND PEROXYMONOSULFATE ANION

CROSS REFERENCE TO RELATED APPLICATIONS

This application is a continuation of international patent appl. no. PCT/US2021/055043, filed on Oct. 14, 2021, which claims priority to U.S. patent appl. No. 63/091,617, filed Oct. 14, 2020, each of which is incorporated herein by reference.

BACKGROUND INFORMATION

Antimicrobial compositions must display efficacy against a wide range of microorganisms, yet not present undue danger or risk to those using or encountering them.

Specific requirements for antimicrobial compositions vary according to intended application (e.g., level and scope of lethality) and applicable public health requirements. As just one example, a product considered to be a "sanitizer" should provide a 5-log reduction against several test organisms within 30 seconds at room temperature; see "Germicidal and Detergent Sanitizing Action of Disinfectants, Official Methods of Analysis of the Assn. of Official Analytical Chemists," ¶960.09 and applicable sections, 15th Ed., (1990) (EPA Guideline 91-2).

Representative antimicrobial compositions intended for use on hard surfaces are described in, for example, U.S. Pat. Nos. 9,314,017, 8,940,792 and 8,865,196 (as well as patents and published applications mentioned in its Background section), as well as U.S. Pat. Publ. Nos. 2010/0086576, 2013/0272922, 2013/0079407 and 2016/0073628.

The U.S. Environmental Protection Agency (EPA) has established a test, EPA MLB SOP MB-20-03 ("Single Tube Method for Determining the Efficacy of Disinfectants against Bacterial Biofilm"), for applicants wishing to include on their products a disinfection of biofilm claim. Products which are able to pass this test then are able to include on their labeling a claim such as, inter alia, Kills 99.9999% of bacteria in biofilm on hard, non-porous surfaces, or Formulated to kill 99.9999% of bacteria in biofilm on hard, non-porous surfaces.

In each case, the specific type of bacteria in biofilm form against which the product has been tested must be listed, with *S. aureus* and *P. aeruginosa* being the only two for which standardized EPA tests exist. To obtain an EPA biofilm hospital disinfectant claim, efficacy against both of these specific bacteria types must be proven.

To date, products able to pass this test have been extremely caustic (pH>12) or acidic (pH<2), have included large amounts of halogen ($Br_2$ or $Cl_2$) or halogen-containing (e.g., hypochlorite) ions, or have included >2% (w/w) of quaternary ammonium surfactants.

An antimicrobial composition having efficacy against endospores has been described in U.S. Pat. No. 10,827,750. The antimicrobial strength and oxidizing capacity of that composition are so high, however, that repeated exposure might raise health concerns in those tasked with cleaning hard surfaces, at least absent increased safety measures.

That which remains desirable is a composition with broad spectrum lethality against both planktonic and biofilm-form microorganisms which is capable of repeated applications to hard surfaces without significant damage and without requiring significant personal protective equipment (PPE) for those using it.

SUMMARY

In one aspect is provided a composition that is lethal to a broad spectrum of microorganisms and is capable of repeated applications to hard surfaces. The composition neither contains nor produces elemental halogen or halogen oxide ions and does not contain more than 0.5% (w/v) quaternary ammonium compounds. The composition is acidic but has a pH≥2.5, preferably pH≥3, more preferably from ~3.4 or 3.5 to ~4.8, and includes solvent and solute components.

The solvent component includes at least 67% (w/v, relative to the total amount of composition) water and a lesser amount of at least one organic liquid, while the solute component includes a weak acid, a conjugate base of that acid, an electrolyte oxidizing agent, and an ionic surfactant.

The composition has an effective solute concentration of at least 2.5 Osm/L, typically at least 3 Osm/L and often even higher, e.g., from ~3 to ~5.5 Osm/L up to the solubility limit of the solute component in the solvent component. The oxidizing electrolyte(s) constitute no more than 2.5% (w/w) of the total amount of the solute component, i.e., the sum of all solute component weights, and typically from about 3 to 3.8 g of the overall composition, on a per liter basis.

The composition can provide extremely large reductions in the number of living microbes (e.g., bacteria, viruses, etc.), even bacteria in biofilm form, with short dwell times. Advantageously, the composition does not require skin protective PPE for those using it.

Also provided is a method of treating a surface. The method involves applying an embodiment of the foregoing composition to the surface and permitting the composition sufficient dwell time to kill at least 99.999% of the microbes thereon. The surface being treated can be an inanimate surface, particularly a hard surface, and advantageously a hard surface in an industrial facility.

Other aspects of the invention will be apparent to the ordinarily skilled artisan from the detailed description that follows. To assist in understanding that description, certain definitions are provided immediately below, and these are intended to apply throughout unless the surrounding text explicitly indicates a contrary intention:

"room temperature" means 22°±2° C.;

"polyacid" means a compound having at least two carboxyl groups and specifically includes dicarboxylic acids, tricarboxylic acids, etc.;

"pH" means the negative value of the base 10 logarithm of $[H^+]$ as determined by an acceptably reliable measurement method such as a properly calibrated pH meter, titration curve against a known standard, or the like;

"$pK_a$" means the negative value of the base 10 logarithm of a particular compound's acid dissociation constant;

"$E°_{red}$" means the standard voltage for a reduction half-reaction in water at 25° C.;

"buffer" means a compound or mixture of compounds having an ability to maintain the pH of a solution to which it is added within relatively narrow limits;

"buffer precursor" means a compound that, when added to a mixture containing an acid, results in a buffer;

"electrolyte" means a compound that exhibits some dissociation when added to water;

"non-oxidizing electrolyte" means an electrolyte other than one that can act as an oxidizing agent;

"benzalkonium chloride" refers to any compound defined by the following general formula

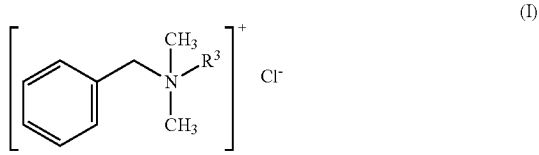

(I)

where $R^3$ is a $C_8$-$C_{18}$ alkyl group, or any mixture of such compounds;

"effective solute concentration" is a measurement of the colligative property resulting from the number of moles of molecules (from nonelectrolyte) or ions (from electrolytes) present in a given volume solution, typically presented in units of osmoles per liter;

"$\delta_p$" is the dipolar intermolecular force Hansen Solubility Parameter (HSP), with the value for a solution or mixture of solvents being calculated by $$\delta_p = \sum_{i=1}^{n} (\delta_{di} \times x_{di}) \qquad \text{(II)}$$

where $\delta_{di}$ is the energy from dipolar intermolecular force for solvent component i, $x_{di}$ is the percentage of solvent component i relative to the total amount of solvent components, and n is the total number of solvent components;

"substituted" means containing a heteroatom or functionality (e.g., hydrocarbyl group) that does not interfere with the intended purpose of the group in question;

"microbe" means any type of microorganism including, but not limited to, bacteria, viruses, fungi, viroids, prions, and the like;

"antimicrobial agent" means a substance having the ability to cause greater than a 90% (1 log) reduction in the number of one or more microbes;

"active antimicrobial agent" means an antimicrobial agent that is effective only or primarily during the active parts of the lifecycle, e.g., cell division, of a microbe;

"disinfectant" means a substance that is lethal to one or more types of bacteria;

"high level disinfectant" means a disinfectant that is capable of killing all bacteria except for small amounts of bacteria in endospore form;

"sterilant" means a substance capable of at least a 6 log (99.9999%) reduction of all microbes, regardless of form;

"contact time" or "dwell time" means the amount of time that a composition is allowed to contact a surface and/or an endospore on such a surface;

"hard surface" means any surface that is substantially resistant to absorption of fluids and, in most cases, non-deformable;

"healthcare" means involved in or connected with the maintenance or restoration of the health of the body or mind;

"industrial" means any non-healthcare commercial facility or enterprise; and

"food production" means an industrial facility or enterprise engaged in the manufacturing, processing, production, or serving of edible or potable items and/or ingredients thereof.

Throughout this document, unless the surrounding text explicitly indicates a contrary intention, all values given in the form of percentages are w/v, i.e., grams of solute per liter of composition and pH values are those which can be obtained from any of a variety of potentiometric techniques employing a properly calibrated electrode.

The relevant portion(s) of any specifically referenced patent and/or published patent application are incorporated herein by reference.

DETAILED DESCRIPTION OF ILLUSTRATIVE EMBODIMENTS

The composition is described first in terms of its properties and components, many of which are widely available and relatively inexpensive, and then in terms of certain uses.

The solvent component of the composition includes a majority of water. Relative to its overall volume, a composition includes at least 67%, often at least 70%, and typically at least 75% (all w/v) water. On a per liter basis, a composition includes from ~675 to ~800 mL, commonly from ~700 to ~790 mL, more commonly from ~720 to ~780 mL, usually from ~725 to ~775 mL, typically from ~740 to ~770 mL, and most typically 765±10 mL water. The water need not be specially treated or purified (e.g., distilled and/or deionized), although preference certainly can be given to water that does not interfere with the intended antimicrobial effect of the composition.

The solvent component of the composition also includes at least one organic liquid having a $\delta_p$ value lower than that of water ($\delta_p \approx 16.0$ MPa$^{1/2}$) and preferably significantly lower (e.g., $4 \leq \delta_p \leq 12$ or $5 \leq \delta_p \leq 10$), where $\delta_p$ is the dipolar intermolecular force (polarity) Hansen Solubility Parameter (HSP). (Hereinthroughout, the $\delta_p$ value for a given solvent or solvent component (i.e., liquid) is determined at room temperature.)

The distance between the HSPs of two materials in so-called Hansen space ($R_a$) can be calculated according to the following formula:

$$(R_a)^2 = 4(\delta_{d2} - \delta_{d1})^2 + (\delta_{p2} - \delta_{p1})^2 + (\delta_{h2} - \delta_{h1})^2 \qquad \text{(III)}$$

where $\delta_d$ is the energy from dispersion forces between the molecules, $\delta_p$ is defined as above, and $\delta_h$ is the energy from hydrogen bonds between molecules.

A simple composite affinity parameter, the Relative Energy Difference (RED), represents the ratio of the calculated HSP difference ($R_a$) to the interaction radius ($R_0$), i.e., RED=$R_a/R_0$. In situations where RED<1.0, the solubilities of the molecules are sufficiently similar that one will dissolve in the other; in situations where RED>1.0, the solubilities of the molecules are not sufficiently similar for one to dissolve the other; and, in situations where RED≈1.0, partial dissolution is possible.

The organic liquid(s) often is/are present at concentrations of 5 to 20%, commonly 7 to 18%, more commonly 8 to 17%, even more commonly 9 to 16%, and typically 10 to 15% (all w/v, based on total volume of solvent component).

Accordingly, the $\delta_p$ value of the overall solvent component generally is less than 15.6, no more than 15.5, no more than 15.4, no more than 15.3, no more than 15.2, no more than 15.1, or no more than 15.0 MPa$^{1/2}$. In some embodiments, the $\delta_p$ value of the overall solvent component can range from 13.5 to 15.5 MPa$^{1/2}$, from 13.7 to 15.3 MPa$^{1/2}$, from 13.9 to 15.1 MPa$^{1/2}$, and from 14.0 to 15.0 MPa$^{1/2}$.

The amount of a given organic liquid (or mixture of organic liquids) to be added to water can be calculated using formula (II) if a targeted $\delta_p$ value is known. Similarly, a projected $\delta_p$ value can be calculated using formula (II) if the amount of organic liquid(s) and their individual $\delta_p$ values are known.

The solvent component can consist of, or consist essentially of, only water and one or more organic liquids, with preference being given to mixtures of species of the same genus of organic liquids, e.g., two ketones or two alcohols rather than one ketone and one alcohol. In certain preferred embodiments, the solvent component can consist of, or consist essentially of, water and one organic liquid, preferably one having a $\delta_p$ value less than 10 MPa$^{1/2}$. In yet other embodiments, the solvent component can consist of, or consist essentially of, water and two or more organic liquids, with the resulting solvent component having $\delta_p$ value that can be calculated using formula (II); again, preference is given to mixtures of species of the same genus of organic liquids, e.g., two ethers or two alcohols rather than one ether and one alcohol.

With respect to organic liquids that can be employed in the solvent component, those which are miscible with one another and/or water are preferred. Non-limiting examples of potentially useful organic liquids include ketones such as acetone, methyl butyl ketone, methyl ethyl ketone and chloroacetone; acetates such as amyl acetate, ethyl acetate and methyl acetate; (meth)acrylates and derivatives such as acrylamide, lauryl methacrylate and acrylonitrile; aryl compounds such as benzene, chlorobenzene, fluorobenzene, toluene, xylene, aniline and phenol; aliphatic alkanes such as pentane, isopentane, hexane, heptane and decane; halogenated alkanes such as chloroform, methylene dichloride, chloroethane and tetrachloroethylene; cyclic alkanes such as cyclopentane and cyclohexane; and polyols such as ethylene glycol, diethylene glycol, propylene glycol, hexylene glycol, and glycerol. When selecting such organic liquids for use in the solvent component of the composition, possible considerations include avoiding those which contain a functional group that will react with the acid(s) and optionally, salt(s) employed in the composition and favoring those which possess higher regulatory pre-approval limits.

Preferred organic liquids include ethers and alcohols due to their low tissue toxicity and environmental friendliness. These can be added at concentrations up to the solubility limit of the other ingredients in the composition.

Ether-based liquids that can be used in the solvent component include those defined by the following general formula $$R^1(CH_2)_xO-R^2-[O(CH_2)_z]_yZ \qquad (IV)$$

where x is an integer of from 0 to 20 (optionally including, where $2 \leq x \leq 20$, one or more points of ethylenic unsaturation), y is 0 or 1, z is an integer of from 1 to 4, $R^2$ is a $C_1$-$C_6$ linear or branched alkylene group, le is a methyl, isopropyl or phenyl group, and Z is a hydroxyl or methoxy group. Non-limiting examples of glycol ethers (formula (IV) compounds where Z is OH) that can be used in the solvent component are set forth below in Table 1.

TABLE 1

Representative glycol ethers, with formula (IV) variables and $\delta_p$ values

|  | $R^1$ | x | $R^2$ | y | z | $\sim\delta_p$ (MPa$^{1/2}$) |
|---|---|---|---|---|---|---|
| ethylene glycol monomethyl ether | $CH_3$ | 0 | $(CH_2)_2$ | 0 | — | 9.2 |
| ethylene glycol monoethyl ether | $CH_3$ | 1 | $(CH_2)_2$ | 0 | — | 9.2 |
| ethylene glycol monopropyl ether | $CH_3$ | 2 | $(CH_2)_2$ | 0 | — | 8.2 |
| ethylene glycol monoisopropyl ether | $(CH_3)_2CH$ | 0 | $(CH_2)_2$ | 0 | — | 8.2 |
| ethylene glycol monobutyl ether | $CH_3$ | 3 | $(CH_2)_2$ | 0 | — | 5.1 |
| ethylene glycol monophenyl ether | $C_6H_5$ | 0 | $(CH_2)_2$ | 0 | — | 5.7 |
| ethylene glycol monobenzyl ether | $C_6H_5$ | 1 | $(CH_2)_2$ | 0 | — | 5.9 |
| diethylene glycol monomethyl ether | $CH_3$ | 0 | $(CH_2)_2$ | 1 | 2 | 7.8 |
| diethylene glycol monoethyl ether (DGME) | $CH_3$ | 1 | $(CH_2)_2$ | 1 | 2 | 9.2 |
| diethylene glycol mono-n-butyl ether | $CH_3$ | 3 | $(CH_2)_2$ | 1 | 2 | 7.0 |
| propylene glycol monobutyl ether | $CH_3$ | 3 | $(CH_2)_3$ | 0 | — | 4.5 |
| propylene glycol monoethyl ether | $CH_3$ | 1 | $(CH_2)_3$ | 0 | — | 6.5 |
| propylene glycol monoisobutyl ether | $(CH_3)_2CH$ | 1 | $(CH_2)_3$ | 0 | — | 4.7 |
| propylene glycol monoisopropyl ether | $(CH_3)_2CH$ | 0 | $(CH_2)_3$ | 0 | — | 6.1 |
| propylene glycol monomethyl ether | $CH_3$ | 0 | $CH_2CH(CH_3)$ | 0 | — | 6.3 |
| propylene glycol monophenyl ether | $C_6H_5$ | 0 | $CH_2CH(CH_3)$ | 0 | — | 5.3 |
| propylene glycol monopropyl ether (PGME) | $CH_3$ | 2 | $CH_2CH(CH_3)$ | 0 | — | 5.6 |
| triethylene glycol monomethyl ether | $CH_3$ | 0 | $(CH_2)_2$ | 2 | 2 | 7.6 |
| triethylene glycol monooleyl ether | $CH_3$ | 17* | $(CH_2)_2$ | 2 | 2 | 3.1 |

*includes unsaturation at the 9 position

Cyclic and $C_1$-$C_{16}$ acyclic (both linear and branched, both saturated and unsaturated) alcohols, optionally including one or more points of ethylenic unsaturation and/or one or more heteroatoms other than the alcohol oxygen such as a halogen atom, an amine nitrogen, and the like, can be employed as an organic liquid in the solvent component of the composition. Nonlimiting examples of representative examples are compiled in the following table.

TABLE 2

Representative alcohols, with $\delta_p$ values

|  | $\sim\delta_p$ (MPa$^{1/2}$) |
|---|---|
| 2-propenol | 10.8 |
| 1-butanol | 5.7 |
| t-butyl alcohol | 5.1 |
| 4-chlorobenzyl alcohol | 7.5 |
| cyclohexanol | 4.1 |
| 2-cyclopentenyl alcohol | 7.6 |
| 1-decanol | 10.0 |
| 2-decanol | 10.0 |
| 2,3-dichloropropanol | 9.2 |
| 2-ethyl-1-butanol | 4.3 |
| ethanol | 8.8 |
| 2-ethyl-hexanol | 3.3 |

TABLE 2-continued

Representative alcohols, with $\delta_p$ values

| | $\sim\delta_p$ (MPa$^{1/2}$) |
|---|---|
| isooctyl alcohol | 7.3 |
| octanol | 3.3 |
| methanol | 12.3 |
| oleyl alcohol | 2.6 |
| 1-pentanol | 4.5 |
| 2-pentanol | 6.4 |
| 1-propanol | 6.8 |
| 2-propanol (IPA) | 6.1 |

For further information on organic liquid-containing solvent components, the interested reader is directed to U.S. Pat. No. 10,021,876.

A preferred solvent component is one which includes only water and C$_2$-C$_4$ acyclic alcohol(s) in a weight ratio of from ~7:1 to ~9:1. Such a solvent component can be obtained by mixing ~725 to ~800 g, preferably ~750 to ~775 g, water with ~90 to ~120 g, preferably ~95 to ~115 g alcohol(s). An embodiment of this type of preferred solvent component includes 765±10 g water and 100±5 g 2-propanol.

A solvent component of the type just described has a $\delta_p$ value of from 14.2 to 15.2 MPa$^{1/2}$, typically from 14.4 to 15.1 MPa$^{1/2}$, preferably from 14.6 to 15.0 MPa$^{1/2}$, and more preferably 14.85±0.12 MPa$^{1/2}$.

The solvent component acts to solvate staining compounds, lift dirt, etc., but also to carry the aforementioned solute component, the sub-components of which are described below.

As mentioned previously, the composition is acidic, which means that at least one of the sub-components of the solute component must be an acid, preferably one or more weak acids (i.e., carboxylic acids).

Examples of potentially useful weak acids include monoprotic acids such as formic acid, acetic acid and substituted variants (e.g., hydroxyacetic acid, chloroacetic acid, dichloroacetic acid, phenylacetic acid, and the like), propanoic acid and substituted variants (e.g., lactic acid, pyruvic acid, and the like), any of a variety of benzoic acids (e.g., mandelic acid, chloromandelic acid, salicylic acid, and the like), glucuronic acid, and the like; diprotic acids such as oxalic acid and substituted variants (e.g., oxamic acid), butanedioic acid and substituted variants (e.g., malic acid, aspartic acid, tartaric acid, citramalic acid, and the like), pentanedioic acid and substituted variants (e.g., glutamic acid, 2-ketoglutaric acid, and the like), hexanedioic acid and substituted variants (e.g., mucic acid), butenedioic acid (both cis and trans isomers), iminodiacetic acid, phthalic acid, and the like; triprotic acids such as citric acid, 2-methylpropane-1,2,3-tricarboxylic acid, benzenetricarboxylic acid, nitrilotriacetic acid, and the like; tetraprotic acids such as prehnitic acid, pyromellitic acid, and the like; and even higher degree acids (e.g., penta-, hexa-, heptaprotic, etc.). Where a tri-, tetra-, or higher acid is used, one or more of the carboxyl protons can be replaced by cationic atoms or groups (e.g., alkali metal ions), which can be the same or different.

With respect to the foregoing exemplary acids, smaller molecules are preferred over those which are larger, and those acids which can provide an oxidizing acid by reaction with an electrolyte oxidizing agent (discussed below) are highly preferred. One weak acid which meets both of these criteria is acetic acid, which reversibly forms peracetic acid when exposed to certain electrolyte oxidizing agents. Other organic oxidizing acids include peroxalic acid and diperoxalic acid.

Preferred acids are those which have relatively high pK$_a$ values (i.e., are not considered to be particularly strong acids). This permits production of a composition that has a pH value that is not too low, i.e., below ~2.5, preferably not below ~2.7, more preferably not below ~2.9, and most preferably not below ~3, so that the composition can be used without extreme protective measures by those charged with handling and applying them to surfaces and/or destroying components of articles to be treated. Preferred pK$_a$ values are greater than ~1, greater than ~1.5, greater than ~2, greater than ~2.5, greater than ~3, greater than ~3.5, greater than ~4, greater than ~4.5, greater than ~5, and even greater than ~5.5. Acids with lower pK$_a$ values can be used if steps are taken to ensure compliance with required or desired properties of the composition such as pH range (discussed above) and effective solute concentration (discussed below).

The amount of any given acid employed can be determined from the target pH of the composition and the pK$_a$ value(s) of the chosen acids in view of the type and amounts of compound(s), if any, utilized to achieve the desired effective solute concentration in the composition.

Both to ensure that the pH of the composition is not too low and also to increase its effective solute concentration, the solute component also includes a conjugate base of at least one of the foregoing weak acids. Although not required, use of a conjugate base of the particular acid employed is preferable.

Conjugate base(s) of one or more of the acid(s), upon dissociation, increase the effective amount of solutes in the composition without greatly impacting the molar concentration of hydronium ions while, simultaneously, act to provide a buffered pH to the composition. The identity of the countercation portion of the conjugate base (i.e., salt) is not particularly critical, with common examples including ammonium ions and alkali metal ions; accordingly, where a particular conjugate base is set forth herein (e.g., sodium acetate), this is to be read as inclusive of other acetates unless a contrary indication is specifically mentioned.

Where a polyacid is used, all or fewer than all of the H atoms of the carboxyl groups can be replaced with cationic atoms or groups, which can be the same or different. For example, mono-, di- and trisodium citrate all constitute potentially useful buffer precursors, whether used in conjunction with citric acid or another organic acid. However, because trisodium citrate has three available basic sites, it has a theoretical buffering capacity up to 50% greater than that of disodium citrate (which has two such sites) and up to 200% greater than that of sodium citrate (which has only one such site).

Like the acid(s), the amount of conjugate base(s) can be determined based on the desired composition pH and effective solute concentration. With respect to the former, the composition has a pH of no more than 5, and certain embodiments can have a pH of no more than 4.8, 4.6, 4.4 or even 4.2. Similarly, it has a pH of at least 2.5, generally at least 2.8, typically at least 3.1, and most typically at least 3.4. Ranges of pH values employing each of the lower limits in combination with each of the upper limits are envisioned. Embodiments of the composition can exhibit pH values of 3.75±1, 3.8±0.7, 3.85±0.6, 3.9±0.5, 3.95±0.4, and 4±0.25.

(Many weak acids and conjugate bases of weak acids can be obtained in either anhydrous form or including varying amounts of water of hydration. The presence of water of hydration in such materials is immaterial to their utility as sub-components of the solute component. If a given solute sub-component is not provided in anhydrous form, the water of hydration merely must be subtracted when calculating the number of osmoles provided by that given material. For example, the term "trisodium citrate" is intended to be inclusive of both anhydrous trisodium citrate and all hydrated forms, e.g., trisodium citrate dihydrate.)

Some oxidizing acids are not particularly stable in aqueous solutions. Accordingly, providing a composition with an oxidizing acid prepared in vitro can be advantageous. For example, in one preferred embodiment, to a solvent component of a composition can be provided acetic acid and hydrogen peroxide which, when contacted, reversibly form peracetic acid.

Also present in the solute component of the composition is an electrolyte oxidizing agent that does not contain any active hydrogen atoms when subjected to a Zerewitinoff determination. Non-limiting examples of potentially useful electrolytes, preferably inorganic, oxidizing agents include compounds which include anions such as manganate, permanganate, peroxochromate, chromate, dichromate, peroxymonosulfate, and the like. (Some of these electrolytes can impact pH, so a composition formulated to have a given pH might require adjustment after addition of the oxidizing agent(s).) Preferred are those compounds having $E^0_{red}$ values of at least +1.25 V, preferably at least +1.5 V, more preferably at least +1.75 V, even more preferably at least +2.0 V and most preferably at least +2.25 V.

Most preferred are those electrolytes which include peroxymonosulfate (CAS 70693-62-8) as an anion. A conveniently available form is Oxone™ triple salt ($KHSO_5 \cdot 0.5 \, KHSO_4 \cdot 0.5 \, K_2SO_4$), available from Lanxess (Pittsburgh, Pennsylvania).

Although electrolyte oxidizing agents generally can be added at up to their individual solubility limits, keeping the total amount included well below their solubility limits can positively impact the usage safety characteristics of the final composition. The maximum amount generally is on the order of 10 g per liter of total composition, with exemplary ranges being ~2 to ~8 g/L, ~2.2 to ~7 g/L, ~2.4 to ~6 g/L, ~2.5 to ~5 g/L, ~2.6 to ~4.5 g/L, ~2.7 to ~4.2 g/L, ~2.8 to ~4 g/L, ~2.9 to ~3.8 g/L, and ~3.0 to ~3.6 and exemplary amounts being 3.5±0.4 g/L, 3.4±0.4 g/L, and 3.35±0.25 g/L.

To assist in cleaning, the solute component also includes one or more wetting agents which include, but are not limited to, surfactants. Essentially any material having surface active properties in water can be employed, although those surface active agents that bear some type of ionic charge are expected to have enhanced antimicrobial efficacy because such charges, when brought into contact with a bacteria, are believed to lead to more effective bacterial membrane disruption and, ultimately, to cell leakage and lysis.

Polar surfactants generally are more efficacious than non-polar surfactants, with ionic surfactants being most effective. For polar surfactants, anionic surfactants generally are the most effective, followed by zwitterionic and cationic surfactants, with smaller molecules generally being preferred over larger ones. The size of side-groups attached to the polar head can influence the efficacy of ionic surfactants, with larger sized-groups and more side-groups on the polar head potentially decreasing the efficacy of surfactants.

Potentially useful anionic surfactants include, but are not limited to, ammonium lauryl sulfate, dioctyl sodium sulfosuccinate, perfluorobutanesulfonic acid, perfluorononanoic acid, perfluorooctanesulfonic acid, perfluorooctanoic acid, potassium laurylsulfate, sodium dodecylbenzenesulfonate, sodium laureth sulfate, sodium lauroyl sarcosinate, sodium myreth sulfate, sodium pareth sulfate, sodium stearate, sodium chenodeoxycholate, N-lauroylsarcosine sodium salt, lithium dodecyl sulfate, 1-octanesulfonic acid sodium salt, sodium cholate hydrate, sodium deoxycholate, sodium dodecyl sulfate (SDS, also called sodium lauryl sulfate (SLS)), sodium glycodeoxycholate, and the alkyl phosphates set forth in U.S. Pat. No. 6,610,314. SLS is a particularly preferred material.

Potentially useful cationic surfactants include, but are not limited to, cetylpyridinium chloride (CPC), cetyl trimethylammonium chloride, benzethonium chloride, 5-bromo-5-nitro-1,3-dioxane, dimethyldioctadecylammonium chloride, cetrimonium bromide, dioctadecyldimethylammonium bromide, tetradecyltrimethyl ammonium bromide, benzalkonium chloride (BZK), hexadecylpyridinium chloride monohydrate and hexadecyltrimethylammonium bromide.

Potentially useful nonionic surfactants include, but are not limited to, sodium polyoxyethylene glycol dodecyl ether, N-decanoyl-N-methylglucamine, digitonin, n-dodecyl ß-D-maltoside, octyl ß-D-glucopyranoside, octylphenol ethoxylate, polyoxyethylene (8) isooctyl phenyl ether, polyoxyethylene sorbitan monolaurate, polyoxyethylene (20) sorbitan, 3-[(3-cholamidopropyl) dimethylammonio]-2-hydroxy-1-propane sulfonate, 3-[(3-cholamidopropyl) dimethylammonio]-1-propane sulfonate, 3-(decyldimethylammonio) propanesulfonate inner salt, and N-dodecyl-N,N-dimethyl-3-ammonio-1-propanesulfonate.

Potentially useful zwitterionic surfactants include sulfonates (e.g. 3-[(3-cholamidopropyl)dimethylammonio]-1-propanesulfonate), sultaines (e.g. cocamidopropyl hydroxysultaine), betaines (e.g. cocamidopropyl betaine), and phosphates (e.g. lecithin).

For other potentially useful materials, the interested reader is directed to any of a variety of other sources including, for example, U.S. Pat. Nos. 4,107,328, 6,953,772, 7,959,943, and 8,940,792.

The amount(s) of wetting agent(s) to be included is limited to some extent by the target effective solute concentration and compatibility with other subcomponents of the solute component of the composition. The total amount of wetting agent present in the composition can range from ~0.08 to ~0.25%, typically 0.15±0.05% (all w/v). Maximum amounts of certain types of wetting agents, particularly surfactants, that can be present for a particular end use (without specific testing, review and approval) often are set by governmental regulations.

If more than one type of surfactant is employed, the majority preferably is an ionic surfactant, with the ratio of ionic-to-nonionic surfactant generally ranging from ~2:1 to ~10:1, commonly from ~5:2 to ~15:2, and typically from ~3:1 to ~7:1. Additionally, as is known in the art, a composition should not include surfactant types that are incompatible, e.g., anionic with cationic or zwitterionic with either anionic or cationic.

Because antimicrobial efficacy typically increases as effective solute concentration increases, the effective solute concentration (osmolarity) preferably is relatively high. Effective solute concentration can be calculated using known techniques or, if desired, measured using any of a variety of colligative property measurements such as boiling point elevation, freezing point depression, osmotic pressure and lowering of vapor pressure. (Such colligative property measurements must be adjusted to account for the presence of at least one non-aqueous solvent subcomponent. This can be done by replacing the volume of the organic liquid(s)

with an equivalent volume of water and then acquiring the measurement on this related composition.)

An abundance of solutes ensures the presence of a sufficient amount induce a high osmotic pressure across the cortical membrane, leading to lysis. This efficacy is independent of the particular identity or nature of individual compounds of the solute component, although smaller molecules are generally more effective than larger molecules due to solvent capacity (i.e., the ability to (typically) include more small molecules in a given amount of solvent component than an equimolar amount of larger molecules) and ease of transport across cortical membranes.

If the acid(s), conjugate base(s) and electrolyte oxidizing agent(s) do not provide a desired effective solute concentration, one or non-oxidizing electrolytes, particularly ionic compounds (salts) can be added; see, e.g., U.S. Pat. No. 7,090,882.

Regardless of how achieved, the effective solute concentration of the composition is at least 2.5 Osm/L, generally at least 2.75 Osm/L, often at least 3.0 Osm/L, commonly at least 3.25 Osm/L, more commonly at least 3.5 Osm/L, typically at least 3.75 Osm/L, more typically at least 4 Osm/L. The upper limit of effective solute concentration can range as high as 4.5, 4.75, 5.0, 5.25, 5.5, 5.75, or even 6 Osm/L. Effective solute concentration ranges involving combinations of any of the lower and upper limits set forth in this paragraph also are envisioned.

The antimicrobial composition can include a variety of inactive ingredients (additives) to make it more amenable for use in a particular end-use application without negatively affecting its efficacy in a substantial manner. Examples include, but are not limited to, fragrances, pigments, dyes, defoamers, foaming agents, abrasives, bleaching agents, preservatives (e.g., antioxidants) and the like.

The composition's efficacy does not require the inclusion of an active antimicrobial agent, but such materials can be included in certain embodiments. Non-limiting examples of potentially useful active antimicrobial additives include aldehydes such as gluteraldehyde, formaldehyde, and o-phthalaldehyde; formaldehyde-generating compounds such as noxythiolin, tauroline, hexamine, urea formaldehydes, imidazolone derivatives, and the like; anilides, particularly triclocarban; biguanides such as chlorhexidine and alexidine, as well as polymeric forms such as poly(hexamethylene biguanide); dicarboximidamides (e.g., substituted or unsubstituted propamidine) and their isethionate salts; halogen atom-containing or releasing compounds such as bleach, $ClO_2$, dichloroisocyanurate salts, tosylchloramide, iodine (and iodophors), and the like; silver and silver compounds such as silver acetate, silver sulfadiazine, and silver nitrate; phenols, bis-phenols and halophenols (including hexachlorophene and phenoxyphenols such as triclosan); and no more than 0.5% (w/v) quaternary ammonium compounds.

A typical manner of making a composition involves adding the solute sub-components, either separately or as an admixture, to the solvent component or to the water sub-component thereof, followed by addition of the organic liquid(s). This addition can be done with the benefit of one or both of stirring and heating of the mixing container.

If assurance of a targeted pH range is considered important, small aliquots of a concentrated acid (e.g., 1M HCl) or concentrated base (e.g., 1M KOH) can be used to adjust the pH of an otherwise complete composition into a targeted range.

The following table provides ingredient lists for providing exemplary compositions (~1 L volumes) according to the present invention which have a pH of ~4 and an effective solute concentration of ~4 Osm/L, with amounts being provided in grams.

TABLE 3

Formulation for exemplary compositions

| Ingredient | Preferred species | Amount general | Amount preferred |
|---|---|---|---|
| organic acid | acetic acid | 100-120 | 105-115 |
| conjugate base of organic acid | acetate (e.g., $CH_3C(O)ONa$) | 15-30 | 20-25 |
| ionic surfactant | SLS | 1.5-2.5 | 1.6-2.1 |
| electrolyte oxidizing agent | CAS 70693-62-8 | 2.8-3.9 | 2.9-3.7 |
| organic liquid | 2-propanol | 90-110 | 95-105 |
| water | distilled or USP water | 750-775 | 755-770 |

Various embodiments of the present invention have been provided by way of example and not limitation. As evident from the foregoing tables, general preferences regarding features, ranges, numerical limitations and embodiments are, to the extent feasible and as long as not interfering or incompatible, envisioned as being capable of being combined with other such generally preferred features, ranges, numerical limitations and embodiments.

A composition according to the present invention is intended to be, and in practice is, aggressively antimicrobial. Its intended usages are in connection with inanimate objects such as, in particular, hard surfaces, particularly (but not exclusively) those commonly found in healthcare and/or industrial, particularly food production, facilities.

The composition can be applied to inanimate objects, particularly hard surfaces, in a variety of ways including pouring, spraying or misting, via a distribution device (e.g., mop, rag, brush, textile wipe, etc.), and the like. The composition can be provided as a free-flowing liquid, as a viscous gel or foam, or at any intermediate viscosity.

Once applied to a surface or object, the various ingredients of the composition act on any microbes present. The contact (dwell) time necessary can vary widely depending on the particular composition and its intended end use. The dwell time often will be no more than 15 to 30 seconds in some food production facilities (e.g., tables in restaurants), while it can be significantly higher (e.g., 45 to 600 seconds, often 50 to 500 seconds, commonly 55 to 450 seconds, and typically 60 to 420 seconds) in other such facilities such as meat or produce processing, dairy collection or treatment, bottling, etc.

Embodiments of a composition intended to be applied to hard surfaces can achieve at least a 4, 5 or even 6 log reduction after a contact time of more than 480 seconds, no more than 450 seconds, no more than 420 seconds, no more than 390 seconds, no more than 360 seconds, no more than 330 seconds, no more than 300 seconds, no more than 270 seconds, or even more no more than 240 seconds. All of these are below the 600 seconds limit prescribed in the aforementioned EPA qualification test.

Certain embodiments of the composition may be able to be classified as high level disinfectants or even as sterilants. Compositions which qualify as a disinfectant, high level disinfectant or even sterilant have particular utility in both healthcare and food production settings.

After the composition has been allowed to contact a given object or surface for an appropriate time (in view of factors such as expected bacterial load, type of bacteria potentially present, importance of the object/surface, etc.), it can be left to evaporate or, preferably, rinsed away with water or a dilute saline solution. This can be done after or in connection with physical movement by an object such as a sponge, cloth, squeegee, etc.

The following embodiments are specifically contemplated.

Embodiment [1] of the present disclosure relates to a composition which provides at least a 99.9999% reduction against both *S. aureus* and *P. aeruginosa* in biofilm forms when tested according to EPA MLB SOP MB-20-03, the composition (1) neither containing nor producing elemental halogen or halogen oxide ions and (2) containing no more than 0.5% (w/v) quaternary ammonium compounds, the composition consisting of a) a solvent component that consists of water and one or more organic liquids having a $\delta_p$ value of from 5 to 10 $MPa^{1/2}$ inclusive, the solvent component having an overall $\delta_p$ value of from 13.5 to 15.5 $MPa^{1/2}$ inclusive; and b) a solute component comprising
   1) at least one ionic surfactant and
   2) dissociation products, reaction products, or both of one or more weak acids each of which has a $pK_a$ of from about 3 to about 5, at least one conjugate base of the one or more weak acids, and an electrolyte oxidizing agent having an $E^0_{red}$ value of at least +1.5 V,
   the electrolyte oxidizing agent constituting no more than 2.5% (w/w) of the solute component, the composition having a calculated effective solute concentration of from 3 to 5.5 Osm/L, a pH of from 3.4 to 4.8 and including, on a per liter basis, from 675 to 800 mL water.

Embodiment [2] of the present disclosure relates to the composition of Embodiment [1] wherein the solute component is free of quaternary ammonium compounds.

Embodiment [3] of the present disclosure relates to the composition of any one of Embodiments [1] to [2] wherein the solvent component consists of water and one organic liquid having a $\delta_p$ value of from 5 to 10 $MPa^{1/2}$ inclusive.

Embodiment [4] of the present disclosure relates to the composition of Embodiment [3] wherein the organic liquid is a $C_2$-$C_4$ acyclic alcohol.

Embodiment [5] of the present disclosure relates to the composition of Embodiment [4] wherein the weight ratio of water-to-alcohol in the solvent component is from about 7:1 to about 9:1.

Embodiment [6] of the present disclosure relates to the composition of any one of Embodiments [3] to [4] wherein, on a per liter basis, the alcohol is present at 95 to 115 g.

Embodiment [7] of the present disclosure relates to the composition of any one of Embodiments [1] to [6] wherein the at least one ionic surfactant is an anionic surfactant.

Embodiment [8] of the present disclosure relates to the composition of Embodiment [7] wherein, on a per liter basis, the anionic surfactant is present at 0.8 to 2.5 g.

Embodiment [9] of the present disclosure relates to the composition of any one of Embodiments [1] to [8] wherein the one or more weak acids comprises acetic acid.

Embodiment [10] of the present disclosure relates to the composition of Embodiment [9] wherein the one or more weak acids is acetic acid.

Embodiment [11] of the present disclosure relates to the composition of any one of Embodiments [9] to [10] wherein the conjugate base is an alkali metal acetate.

Embodiment [12] of the present disclosure relates to the composition of any one of Embodiments [1] to [11] wherein the electrolyte oxidizing agent comprises peroxymonosulfate anion.

Embodiment [13] of the present disclosure relates to the composition of any one of Embodiments [1] to [12] wherein, on a per liter basis, the electrolyte oxidizing agent is present at from 3 to 3.8 g.

Embodiment [14] of the present disclosure relates to the composition of any one of Embodiments [1] to [13] wherein the composition has a pH of from 3.1 to 4.5.

Embodiment [15] of the present disclosure relates to the composition of Embodiment [14] wherein the composition has a pH of from 3.75 to 4.25.

Embodiment [16] of the present disclosure relates to the composition of any one of Embodiments [1] to [15] having a calculated effective solute concentration of from 3.75 to 4.75 Osm/L.

Embodiment [17] of the present disclosure relates to a composition which provides at least a 99.9999% reduction against both *S. aureus* and *P. aeruginosa* in biofilm forms when tested according to EPA MLB SOP MB-20-03, the composition consisting of, on a per liter basis, 750 to 775 g water, 90 to 110 g 2-propanol, 100 to 120 g acetic acid, 15 to 30 g alkali metal salt of acetic acid, 2.8 to 3.9 g of a compound classified as CAS 70693-62-8, and 1.5 to 2.5 g sodium lauryl sulfate.

Embodiment [18] of the present disclosure relates to the composition of Embodiment [17] consisting of, on a per liter basis, 755 to 770 g water, 95 to 105 g 2-propanol, 105 to 115 g acetic acid, 20 to 25 g alkali metal salt of acetic acid, 2.9 to 3.7 g of a compound classified as CAS 70693-62-8, 1.6 to 2.1 g sodium lauryl sulfate.

Embodiment [19] of the present disclosure relates to the composition of any one of Embodiments [17] to [18] wherein the alkali metal salt of acetic acid is sodium acetate. The acetate optionally can be anhydrous.

Embodiment [20] of the present disclosure relates to a method for disinfecting a hard surface comprising applying thereto and removing therefrom the composition of any one of Embodiments [1] to [19], optionally with physical movement involving a cleaning object, e.g., an article or device.

The following non-limiting, illustrative examples provide detailed conditions and materials that can be useful in the practice of the present invention.

EXAMPLES

An independent microbiology testing laboratory was contracted to grow *S. aureus* and *P. aeruginosa* biofilms according to EPA MLB SOP MB-19-04 ("Preparing a *Pseudomonas aeruginosa* or *Staphylococcus aureus* Biofilm using the CDC Biofilm Reactor") and to evaluate the efficacy of reduced concentration versions of a composition falling within the parameters set forth in Table 3, supra, using the aforedescribed EPA MLB SOP MB-20-03.

Efficacy testing involved five replicates of each of three separately but identically prepared lots. Because the EPA requires testing of compositions at their lower control limits, the formula for these three compositions employed roughly 10% fewer of each of the components (other than water) of a formulation falling within the parameters set forth above in Table 3. The three tested compositions each included, on a per liter basis, approximately 1.6 g SLS, 95.6 g acetic acid and a proportional amount of an acetate, ~2.7 g of the electrolyte oxidizing agent, and 83-87 g of 2-propanol. The measured pH values for the compositions ranged from 3.9 to 4.0.

The three lots were compositionally analyzed one month after their date of manufacture and were utilized in the EPA test methodology less than three months after that.

The approved protocols indicated compliance with the EPA procedure, and the laboratory provided a certification that its work had met the EPA's Good Laboratory Practice Standards and 40 C.F.R. § 160 requirements.

The laboratory's report summary for each of the two types of bacterial biofilms was that lower control limit versions of a composition falling within the parameters set forth above in Table 3 provided at least 6 $\log_{10}$ reductions (99.9999%) in CFUs relative to control.

A pre-clinical contract research organization was contracted to perform safety testing on a full strength version of the composition employed in the aforedescribed efficacy testing, with all tests performed per EPA Health Effects Test Guidelines, specifically, Acute Oral Toxicity—OPTTS 870.1100 (2002)
Acute Dermal Toxicity—OPPTS 870.1200 (1998)
Primary Skin Irritation Testing—OPPTS 870.2500 (1998)
Acute Inhalation Toxicity—OPPTS 870.1300 (1998)
Local Lymph Node Assay—OPPTS 870.2600 (2003)
Bovine Corneal Opacity and Permeability Assay—OPPTS 870.1000 (2002) and OECD Guidelines for the Testing of Chemicals, Test No 437 (2017).

Acute Oral Toxicity testing showed that the composition had an $LD_{50}$ greater than the test stopping point (5000 mg/kg), meaning that oral ingestion is not deemed to present any significant risk.

Likewise, Acute Dermal Toxicity testing for short term acute dermal exposure indicated a single dose $LD_{50}$ greater than the test stopping point (5000 mg/kg).

Results for Primary Skin Irritation testing resulted in the composition being placed in the "slightly irritating to the skin" classification.

Local Lymph Node Assay testing showed that the composition is not considered to be a dermal sensitizer.

The cumulative effect of the results from the preceding three tests is that users of this type of composition need not employ skin protective PPE.

Acute Inhalation Toxicity Testing showed that, for a single acute inhalation exposure to the product, the $LC_{50}$ of the product is greater than 2.24 mg/L. This finding means that an individual need not wear a respirator or mask when handling and using the composition.

Bovine Corneal Opacity Testing resulted in the composition being classified as an EPA Category I and UN GHS Category 1 substance, meaning that users must use safety eyewear to prevent serious eye damage from occurring by direct contact with the eyes.

In summary, safety testing demonstrated an inventive composition, which qualifies for an EPA biofilm claim, has no ingestion or dermal exposure limitations; to the contrary, it is very well tolerated and low in toxicity. Thus, a hospital employee tasked with cleaning a piece of equipment or even a room need not don PPE designed to protect the mouth, nose and/or skin and, instead, merely use safety glasses or goggles when using an inventive composition.

Full versions of the efficacy and safety testing data summarized here resulted in an EPA approval for a biofilm label claim for this composition.

That which is claimed is:

1. A solution which provides at least a 99.9999% reduction against both *S. aureus* and *P. aeruginosa* in biofilm forms when tested according to EPA MLB SOP MB-20-03, said solution neither containing nor producing elemental halogen or halogen oxide ions, said solution consisting of, on a per liter basis:
   a) a solvent component that consists of:
      i) from 675 to 800 mL water; and
      ii) from 95 to 115 g alcohol, said alcohol comprising at least one C2-C4 acyclic alcohol having a δp value of from 5 to 10 $MPa^{1/2}$ inclusive, said solvent component having an overall δp value of from 13.5 to 15.5 $MPa^{1/2}$ inclusive; and
   b) a solute component being free of quaternary ammonium compounds and comprising:
      1) from 0.8 to 2.5 g anionic surfactant,
      2) dissociation products, reaction products, or both, of (A) acetic acid,
      (B) an alkali metal acetate, and
      (C) an electrolyte oxidizing agent comprising peroxymonosulfate anion, wherein said electrolyte oxidizing agent constitutes no more than 2.5% (w/w) of said solute component, said solution having a calculated effective solute concentration of from 3.75 to 4.75 Osm/L and a pH of from 3.75 to 4.25.

2. The solution of claim 1 wherein said at least one $C_2$-$C_4$ acyclic alcohol comprises 2-propanol.

3. The solution of claim 1 wherein said at least one $C_2$-$C_4$ acyclic alcohol is 2-propanol.

4. The solution of claim 1 wherein said electrolyte oxidizing agent comprising peroxymonosulfate anion comprises $2KHSO_5 \cdot KHSO_4 \cdot K_2SO_4$.

5. The solution of claim 1 wherein said electrolyte oxidizing agent copmrising peroxymonosulfate anion is $2KHSO_5 \cdot KHSO_4 \cdot K_2SO_4$.

6. The solution of claim 1 wherein said anionic surfactant comprises sodium lauryl sulfate.

7. The solution of claim 1 wherein said anionic surfactant is sodium lauryl sulfate.

8. The solution of claim 1 wherein said calculated effective solute concentration is from 3.75 to 4.5 Osm/L.

9. The solution of claim 1 wherein said solute component comprises from 1.5 to 2.5 g anionic surfactant.

10. The solution of claim 1 wherein said solvent component consists of from 750 to 775 mL water and from 90 to 110 g alcohol.

11. The solution of claim 1 wherein said solvent component consists of from 755 to 770 mL water and from 95 to 105 g alcohol.

12. A solution which provides at least a 99.9999% reduction against both *S. aureus* and *P. aeruginosa* in biofilm forms when tested according to EPA MLB SOP MB-20-03, said solution consisting of, on a per liter basis, 750 to 775 g water, 90 to 110 g 2-propanol, 100 to 120 g acetic acid, 15 to 30 g sodium acetate, 2.8 to 3.9 g of $2KHSO_5 \cdot KHSO_4 \cdot K_2SO_4$, and 1.5 to 2.5 g sodium lauryl sulfate.

13. The solution of claim 12 consisting of, on a per liter basis, 755 to 770 g water, 95 to 105 g 2-propanol, 105 to 115 g acetic acid, 20 to 25 g sodium acetate, 2.9 to 3.7 g of 2 $KHSO_5 \cdot KHSO_4 \cdot K_2SO_4$, and 1.6 to 2.1 g sodium lauryl sulfate.

14. A method for disinfecting a hard surface comprising applying thereto and removing therefrom the solution of claim 1.

15. The method of claim 14 wherein said hard surface is located in a food production facility.

16. The method of claim 15 wherein said solution is a high-level disinfectant.

17. The method of claim 15 wherein said solution is a sterilant.

18. The method of claim 14 wherein the time between application and removal of said solution is no more than 480 seconds.

19. The method of claim 18 wherein said time is no more than 300 seconds.

20. The method of claim 14 wherein said removing involves physical movement of a cleaning article or device.

* * * * *